United States Patent
Shimizu et al.

(10) Patent No.: US 6,378,760 B1
(45) Date of Patent: Apr. 30, 2002

(54) METHOD FOR MANUFACTURING JOINT OF CARBON STEEL PIPES SUITABLE FOR EXPANSION AND EXPANDING METHOD

(75) Inventors: Takao Shimizu, Nagoya; Hirotsugu Horio, Tokai; Kazushige Kitou; Shigeyuki Inagaki, both of Nagoya; Ryuzo Yamada, Chita, all of (JP)

(73) Assignee: Daido Tokushuko Kabushiki Kaisha (JP)

( * ) Notice: Subject to any disclaimer, the term of this patent is extended or adjusted under 35 U.S.C. 154(b) by 0 days.

(21) Appl. No.: 09/642,786

(22) Filed: Aug. 22, 2000

(30) Foreign Application Priority Data

Aug. 23, 1999 (JP) ............................................ 11-272888

(51) Int. Cl.⁷ .............................................. B23K 20/00
(52) U.S. Cl. ...................... 228/193; 228/194; 228/234.1
(58) Field of Search ................................ 228/193, 194, 228/195, 234.1, 219

(56) References Cited

U.S. PATENT DOCUMENTS

| | | | | |
|---|---|---|---|---|
| 4,049,184 A | * | 9/1977 | Rozengart et al. | |
| 4,700,881 A | * | 10/1987 | Ryan | |
| 4,795,078 A | * | 1/1989 | Kuroki et al. | |
| 6,059,175 A | * | 5/2000 | Hamada et al. | |
| 6,184,493 B1 | * | 2/2001 | Tsuchiya et al. | |
| 6,262,403 B1 | * | 7/2001 | Tsuchiya et al. | |

OTHER PUBLICATIONS

Grow, J. John, What's Happening In Drilling; "Taylor made rigs, expandable–casing and CT drilling in the GOM", WORLD OIL, Apr. 1999, p. 31.

\* cited by examiner

*Primary Examiner*—Tom Dunn
*Assistant Examiner*—Jonathan Johnson
(74) *Attorney, Agent, or Firm*—Bacon & Thomas, PLLC (57) ABSTRACT

Carbon steel pipes are joined to each other in a non-oxidizing atmosphere by using an insert constituted by a Ni-base alloy or a Fe-base alloy having a melting point which is lower than 1200° C. and a thickness of 80 mm or smaller under conditions that the surface roughness Rmax of the joined surfaces of the carbon steel pipes is 20 μm or smaller, the joining temperature is not lower than 1250° C. nor higher than 1330° C., duration at the joining temperature is 30 seconds or longer and the pressure is not lower than 2 MPa nor higher than 4 MPa. The expanding operation is performed such that the maximum difference in level of the joined portion is not larger than 25% of the carbon steel pipe and the expansion ratio is 25% or lower.

4 Claims, 2 Drawing Sheets

METHOD FOR MANUFACTURING JOINT OF CARBON STEEL PIPES SUITABLE FOR EXPANSION AND EXPANDING METHOD

BACKGROUND OF THE INVENTION

1. Field of the Invention

The present invention relates to joining of carbon steel pipes, and more particularly to joining of oil well pipes, such as casing tubes, production tubes or coiled tubes, for use in an oil well or a gas well, joining of pipes for a plant or line pipes for use in the chemical industry, petrochemistry or the like, and a method of enlarging the inner diameter of the joint of carbon steel pipes.

2. Description of the Related Art conventionally, the oil well pipe, such as the casing tube or the production tube, for use in an oil well or a gas well, has been constituted by joining a multiplicity of carbon steel pipes each having a predetermined length (about 10 m to about 15 m).

For example, when an oil well or a gas well is mined, steel pipes, called casing tubes, are embedded in the shaft to protect the shaft dug in the ground and prevent leakage of crude oil or gas. Since the oil well or the gas well is usually present thousands of meters below the ground or the bottom of the sea, the casing tube must have a length of thousands of meters. Crude oil or gas pumped up from the oil well or the gas well is transported to an accumulating tank or a refinery through a separating unit by using a flow line or a pipe line extended for a distance of several kilometers.

The carbon steel pipes for use in the foregoing case are joined by any one of known methods below: a screw joining method (a mechanical coupling method), a welding method (an orbital welding method), a friction welding method or a diffusion bonding method.

The screw joining method is a method arranged to engage screws formed at the ends of the carbon steel pipes to join the carbon steel pipes to each other. The screw joining method has an advantage that time required to join each pipe takes a short time of about 5 minutes to 10 minutes and satisfactory working efficiency can be realized. The foregoing method, however, suffers from a problem in that oil or gas easily leaks through the joined portion. It leads to a fact that the screws provided for the carbon steel pipes must have excellent accuracy. Moreover, excellent skill is required to perform the screw joining operation. To protect the screw portion formed with excellent accuracy from damage, transportation and handling of the carbon steel pipes having the screw portions require close attention to be paid. Although airtightness of the joined portion can be maintained in a case where tensile stress is exerted, the screw joined portion is undesirably enlarged in the radial direction when compressive stress is exerted. Thus, there arises a problem in that leakage of oil or gas cannot be prevented.

In the welding method, a beveling is provided for the end surface of each of the carbon steel pipes and the beveling is filled with metal which must be welded so that the carbon steel pipes are connected to each other. The welding method is free from any leakage of oil or gas from the welded portion if incomplete fusion is performed or a blow hole is not formed. Moreover, an advantage can be realized in that satisfactory welded portion permits equivalent characteristics to those of the base metal to be obtained against compressive stress as well as tensile stress. The welding method, however, suffers from unsatisfactory efficiency. Since multilayer welding must be performed in a case of thick pipes each having a large diameter, an excessively long time of one to two hours is required to complete one joint. Moreover, there arises a problem in that influences of the environment including the weather and wind are exerted on the welding operation which is performed at the site. What is worse, excellent welding skills are required.

In the friction welding method, the abutted carbon steel pipes are relatively rotated or slid while pressure is being applied. Then, thus-generated fictional heat is used to soften and weld the ends of the carbon steel pipes to each other. The foregoing method is able to realize advantages in that any skill is not required, the joining operation can be completed in a short time and excessive influence of the operation environment can substantially be eliminated. However, the foregoing method cannot prevent flash of the inner and outer surfaces of the joined portion of the carbon steel pipes. Therefore, there arises a problem in that removal of the flash, in particular, removal of the flash formed on the inner surface requires a long time. As a method to solve the foregoing problem, a radial friction welding method has been developed. In the method, a ring having a wedge-like cross section is inserted between the end surfaces of a pair of carbon steel pipes while securing the pair of the carbon steel pipes, the ring is inwards pushed toward the center of the carbon steel pipe to perform pressure-welding. The pressure-welded joint attains only poor characteristic. Therefore, there is no report about the employment of the method to join the oil-well pipes.

The diffusion joining method is able to prevent any leakage of oil or gas through the joined portion if the joining operation is performed under appropriate conditions. Although resistance against compressive stress arises similarly to the foregoing welding method, time required to complete one joint can be shortened to about ⅓ to ½ of the welding method. Thus, advantage can be realized in that joints exhibiting high quality can efficiently be formed. Therefore, the diffusion joining method is a significantly advantageous method as a method of joining oil-well pipes and line pipes.

On the other hand, in order to reduce the oil or gas producing cost, a method has been developed with which a shaft having a diameter smaller than that of the conventional method is formed. Moreover, casing tubes each having a length of hundreds of meters and inserted into the shaft is expanded on the ground (World Oil: P.31, April, 1999).

In the foregoing method, a tool which has been inserted into a casing tube having a long length of hundreds of meters and which has an outer diameter larger than the outer diameter of the tube is moved in the tube by using hydraulic pressure or the like. Thus, the inner diameter of the tube is continuously enlarged. Therefore, the diameter of the shaft is reduced to reduce drilling cost. The distance from the shaft to the casing tube is shortened to reduce the cementing cost. Moreover, the number of the required casing tubes is decreased. Thus, reduction in the production cost of oil or gas is expected.

As described above, the casing tube having the long length of hundreds of meters cannot be constituted by one carbon steel pipe. Therefore, a multiplicity of carbon steel pipes each having a predetermined length are joined to one another to form a joint of carbon steel pipes and expanded. The joints of carbon steel pipes are connected to one another by any one of the foregoing methods, such as the above described screw joining method (the mechanical coupling method), the welding method (the orbital welding method), the friction welding method and the diffusion bonding method. Also the joined portion of the joint of carbon steel pipes is expanded similarly to the base metal of the carbon steel pipe. Therefore, the joined portion must have diameter-expansion characteristic similar to that of the base metal of the carbon steel pipe.

When the joints of carbon steel pipes connected by the screw joining method are expanded, deformation of the joined portion results to loose the clamped screws. Thus, there arises a problem in that oil or gas easily leaks. Therefore, precise screws each having a special shape are employed. However, the foregoing method cannot permit satisfactory characteristics to be obtained. Moreover, machining of the foregoing special screws requires a large cost. To protect the screw portions from damage, there arises a problem in that transportation or handling of the screws require close attention to be paid. Therefore, its applicable range is limited.

The mechanical characteristics of the welded portion of each of joints of the carbon steel pipes joined by the welding method are similar to those of the base metal if the welded portion is free from any defects, such as incomplete fusion or pores. To maintain the mechanical characteristics of the welded portion, a projection called "weld reinforcement" is formed on the outer surface of the welded portion of the carbon steel pipes. Moreover, projections called "penetration beads" are formed on the inner surface of the welded portion of the carbon steel pipe. Therefore, expansion of the joint of carbon steel pipes joined by the welding method using an expanding tool must have a process for removing the penetration beads on the inner surface of the welded portion of the carbon steel pipe which inhibits passing of the expanding tool. The removal of the penetration beads formed on the inner surface of the welded portions of the carbon steel pipes at the site in the oil well or the gas well requires a great cost and encounters difficulty. From a viewpoint of preventing defects, such as cracks of the welded portion in the expanding process, the ends of the weld beads on the outer surface of the welded portion of the carbon steel pipes must be smoothed. As an alternative to this, the weld reinforcement on the outer surface of the welded portion of the carbon steel pipes must be removed. There arises a problem in that also the foregoing operation requires a great cost.

The joint of carbon steel pipes which has been friction-welded by the friction welding method encounters formation of flash on the outer surface of the welded portion. Therefore, expansion of the joint of carbon steel pipes welded by the friction welding method by using an expanding tool must perform a process for removing at least flash on the inner surface of the welded portion of the carbon steel pipes. The removal of the flash formed on the inner surface of the welded portions of the carbon steel pipes and obstructing passing of the expanding tool at the site in the oil well or the gas well requires a great cost and encounters difficulty. From a viewpoint of preventing defects, such as cracks of the welded portion in the expanding process, the flash on the outer surface of the welded portion of the carbon steel pipes which serve as stress concentration source must be smoothed. Alternatively, the flash on the outer surface of the welded portion of the carbon steel pipes must be removed. There arises a problem in that the foregoing machining processes require a great cost.

The joint of carbon steel pipes joined by using the diffusion welding method does not suffer from formation of weld reinforcement on the outer surface of the welded portion of the carbon steel pipes and penetration beads formed on the inner surface of the same as distinct from the welding method. Moreover, formation of flash on the inner and outer surfaces of the welded portion of the carbon steel pipes can be prevented as distinct from the friction welding method. Therefore, when the joint of carbon steel pipes joined by the diffusion welding method is expanded by using the expanding tool, the necessity of removing the projections formed on the inner surface of the joint of carbon steel pipes which obstructs passing of the expanding tool can be eliminated as distinct from the welding method or the friction welding method. Moreover, the necessity of smoothing the projections formed on the outer surface of the joint of carbon steel pipes which serve as the stress concentration source or removing projections formed on the outer surface of the joint of carbon steel pipes in order to prevent occurrence of defects, such as cracks, of the welded portion in the expanding process can be eliminated. Therefore, an advantage can be obtained in that the expanding operation can significantly efficiently be performed.

When joint of carbon steel pipes is manufactured by using the diffusion joining method, the following factors are previously examined: the tensile strength of the joint of carbon steel pipes in a state where joint has been established and an influence of the joining temperature which is exerted on the characteristics, such as fatigue strength and the like, duration time at the joining temperature and the joining conditions, such the pressure, which are exerted on the joined surfaces. Thus, a range of the joining conditions which satisfies required characteristics is obtained to manufacture the joint of carbon steel pipes.

A situation will now be considered in which a tool having an outer diameter larger than the inner diameter of the joint of carbon steel pipes is inserted into the joint to expand the joint of carbon steel pipes. The joint of carbon steel pipes joined under condition satisfying the joining conditions obtained from a result of examination of the influence of the joining conditions which is exerted on the characteristic of the joint of carbon steel pipes in the joined state cannot eliminate fear of occurrence of defects, such as cracks of the joined portion, during the expanding operation. Moreover, satisfactory characteristics of the expanded joint of carbon steel pipes cannot be obtained.

If the joined portion of the joint of carbon steel pipes inserted into hundreds-meter-deep shaft and having a length of hundreds of meters is cracked, pressurizing fluid leaks through the cracks. It leads to a fact that the pressure for forwards moving the expanding tool is lowered. As a result, the expanding tool cannot furthermore be moved at the cracked portion. Hence it follows that the expanding operation cannot be continued. In the foregoing case, the foregoing problem cannot easily be restored. If the worst happens, the oil well or the gas well must be abandoned. Thus, a great loss is produced.

Further, if the joined portion of the joint of carbon steel pipes inserted into hundreds-meter-deep shaft and having a length of hundreds of meters is cracked, the joint of carbon steel pipes forwards than the position at which the cracks have occurred are sometimes separated. In the foregoing case, the expanding operation cannot be continued. What is worse, the shock sometimes causes the shaft to fall or the pressuring fluid is jetted from the gap between the shaft and the expanded joint of carbon steel pipes. Thus, a very dangerous state is realized. In the foregoing case, the foregoing accident cannot easily be restored. If the worst happens, the oil well or the gas well must be abandoned. Thus, a great loss is produced.

SUMMARY OF THE INVENTION

An object of the present invention is to provide a method of manufacturing a joint of carbon steel pipes suitable for a joining method in that carbon steel pipes are joined to one another in an appropriate joining condition range so as to expand the joint of carbon steel pipes by inserting a tool having an outer diameter larger than the inner diameter of the joint of carbon steel pipes into the joint to expand the joint of carbon steel pipes. Another object of the present invention is to provide a method of expanding a joint of carbon steel pipes which is free from an apprehension that defects, such as cracks, occurs in the joined portion during the expanding operation.

Figure 1A:
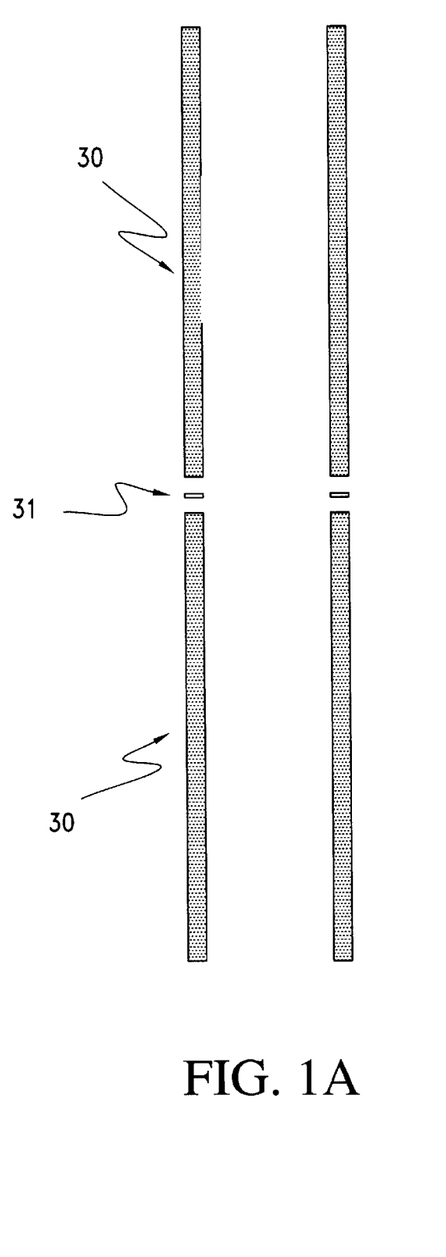
FIGS. 1A and 1B are diagrams showing processes of a method of manufacturing a joint of carbon steel pipes according to an embodiment of the present invention.
Figure 1B:
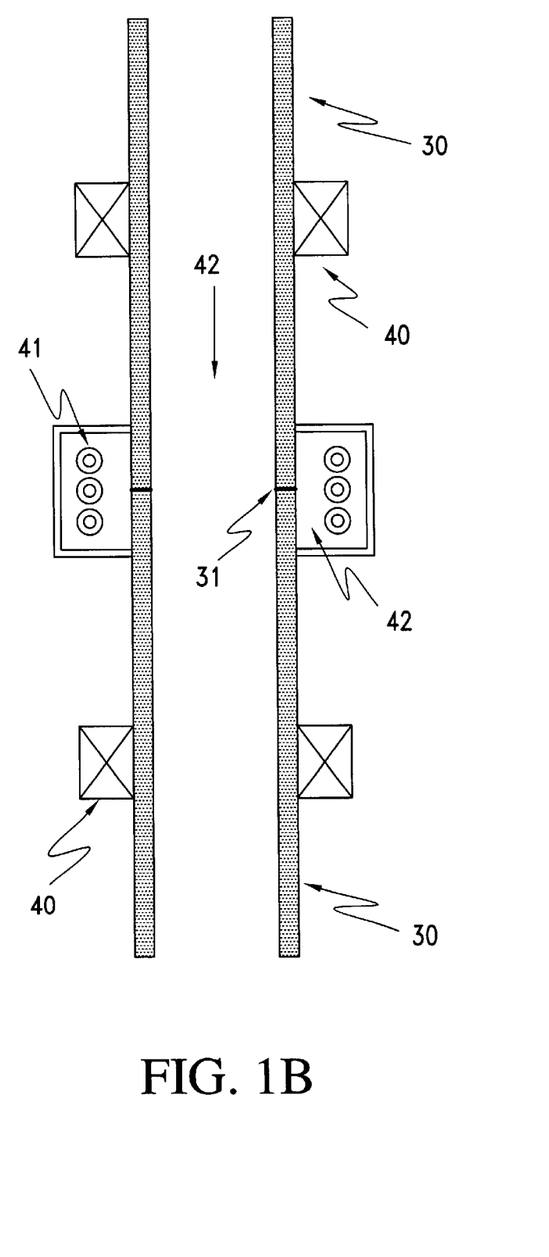

To solve the above-mentioned problems, a method of manufacturing a joint of carbon steel pipes suitable for expansion according to the present invention, as shown in FIG. 1, comprises: abutting carbon steel pipes (30) against each other; inserting an insert (31) having a melting point (Ti) lower than a melting point (Tb) of a base metal of the carbon steel pipes between joint surfaces of the carbon steel pipes; heating at least a portion adjacent to the joint portion to a temperature (T) expressed by Ti<T <Tb; and pressurizing and holding the two carbon steel pipes (30) to diffusion-weld the two carbon steel pipes to each other, wherein the insert (31) comprises a Ni-base alloy or a Fe-base alloy having a melting point lower than 1200° C. and a thickness of 80 $\mu$m, and a joining operation is performed in a non-oxidizing atmosphere under conditions that surface roughness Rmax of the joining surfaces of the carbon steel pipes is 20 $\mu$m or smaller, joining temperature is in the range of 1250° C. to 1330° C., duration at the joining temperature is 30 seconds or longer and applied pressure is in the range of 2 MPa to 4 MPa.

Figure 2A:
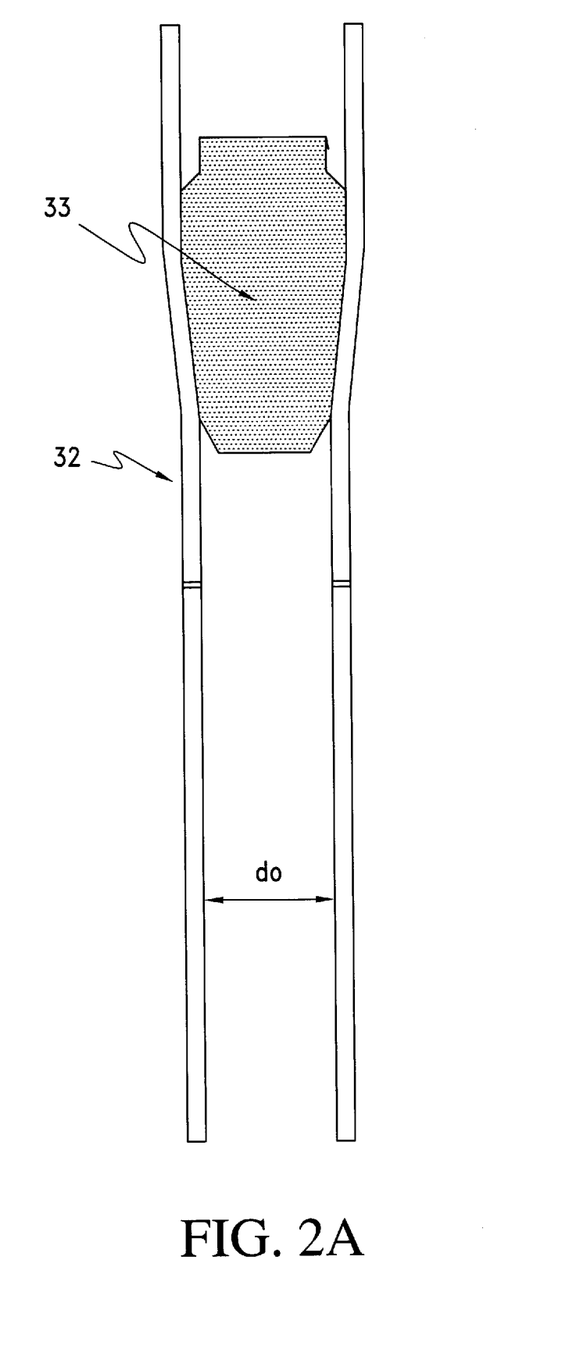
FIGS. 2A and 2B are diagrams showing processes of a method of expanding the joint of carbon steel pipes according to the embodiment of the present invention.
Figure 2B:
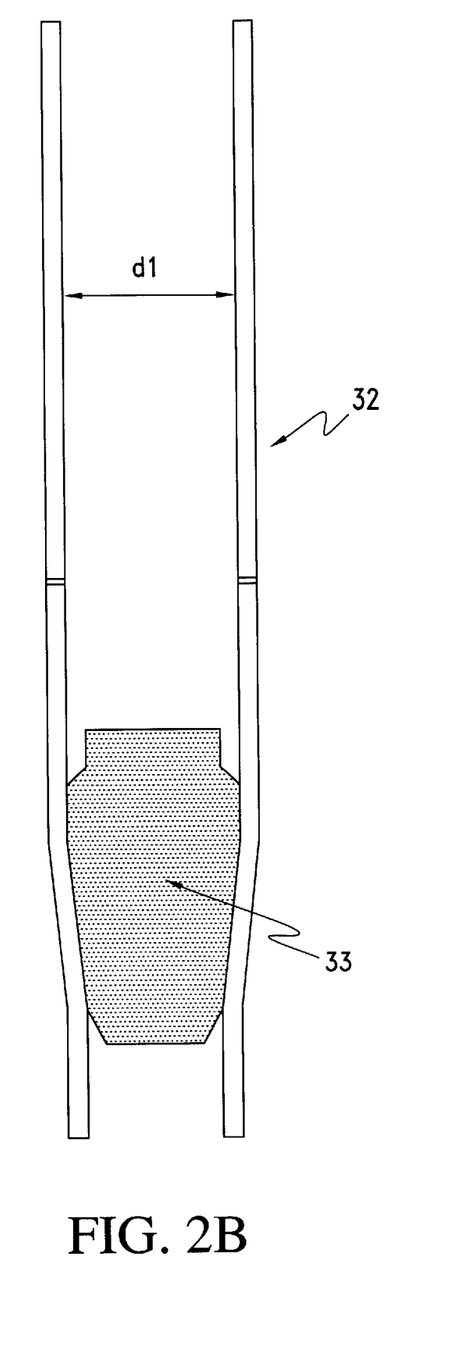

As shown in FIG. 2, according to the present invention, there is provided a method of expanding a joint of carbon steel pipes by using a tool (33) inserted into a joint (32) constituted by joining a plurality of carbon steel pipes, the method of expanding a joint (32) of carbon steel pipes comprising the steps of: using a joint (32) of carbon steel pipes incorporating joint portions each having a maximum difference in level which is not larger than 25% of the thickness of the carbon steel pipe; and making an expansion ratio of the inner diameter of the joint of carbon steel pipes (inner diameter (d1) of carbon steel pipe after expansion–inner diameter (d0) of carbon steel pipe before expansion)/ inner diameter (d0) of carbon steel pipe before expansion× 100%) to be 25% or lower.

DETAILED DESCRIPTION OF THE INVENTION

Preferred embodiments of the present invention will now be described with reference to the drawings. FIGS. 1A and 1B show a process of a method of manufacturing a joint of carbon steel pipes according to a first embodiment of the present invention. Referring to FIGS. 1A and 1B, the method of manufacturing a joint of carbon steel pipes according to the present invention has a process for joining the carbon steel pipes to one another.

The process for joining the carbon steel pipes will now be described. As shown in FIG. 1A, the joining process is a process for abutting carbon steel pipes 30 each having an end surface machined to have predetermined surface roughness. Moreover, an insert 31 having a melting point lower than that of the carbon steel pipe 30 is inserted between the end surfaces. Thus, the carbon steel pipes 30 are liquid phase diffusion welded to each other.

FIG. 1B shows an example of a process for liquid phase diffusion welding the carbon steel pipes 30 by inserting the insert 31 between the joining surfaces of the carbon steel pipes 30. The carbon steel pipes 30 having the end surfaces machined to have predetermined surface roughness are held by holding units 40. Then, the insert 31 is inserted between the end surfaces of the carbon steel pipes 30, and then predetermined pressure is applied to the end surfaces of the carbon steel pipes 30.

Then, the abutting portions of the carbon steel pipes 30 are brought to a non-oxidizing atmosphere 42. A high frequency induction heating coil 41 is operated to heat the abutting portions to a temperature higher than the melting point of the insert 31 and lower than the melting point of the carbon steel pipe 30. The realized temperature of the abutted portions is maintained for a predetermined time so that elements contained in the insert 31 are diffused in the carbon steel pipes 30. Thus, joint 32 of carbon steel pipes 30 joined firmly can efficiently be obtained.

The thus-manufactured joint 32 of carbon steel pipes 30 is subjected to a process using a tool having an outer diameter larger than the inner diameter of the joint 32 of carbon steel pipes 30 to enlarge (expand) its inner diameter. Therefore, the joined portion of the joint 32 of carbon steel pipes 30 must have characteristics to endure the expanding operation. Hence it follows that the carbon steel pipes 30 must be joined to each other under appropriate conditions. Specifically, it is preferable that the joining process is performed under the following conditions.

It is preferable that the insert 31 is made of a Ni alloy or a Fe alloy having a melting point lower than 1200° C. If the melting point of the insert 31 is 1200° C. or higher, a high joining temperature is required. Therefore, there is apprehension that the base metal of the carbon steel pipes 30 is molten during the joining operation. As an alternative to this, excessive deformation of the joined portion takes place. It leads to a fact that the joined portion is fractured during the expanding process. What is worse, non-joined portion caused from non-fusion of the insert 31 is undesirably formed. Incidentally, it is preferable that the insert 31 is made of a Ni alloy or a Fe alloy having a melting point higher than 1000° C.

It is preferable that the thickness of the insert 31 is 80 $\mu$m or smaller. If the thickness of the insert 31 is larger than 80 $\mu$m, diffusion of elements in the Joined interface becomes insufficient. Thus, the joining strength is decreased and the joined portion is undesirably cracked during the expanding process. Incidentally, it is preferable that the thickness of the insert 31 is 20 $\mu$m or larger.

The shape of the insert 31 is not limited to a specific shape. An insert 31 having a thickness of 80 $\mu$m or smaller and formed into a foil shape may be inserted between the joined surfaces. As an alternative to this, a powder or scale-shape insert 31 may be dispersed to the joined interface or a paste insert 31 may be applied to the interface.

It is preferable that the surface roughness Rmax of the joined surface is 20 $\mu$m or lower. If the surface roughness Rmax is larger than 20 $\mu$m, the carbon steel pipes 30 cannot brought into hermetic contact with each other at the joined surfaces. As a result, sufficient high strength and ductility cannot be obtained in the joined portion. Moreover, the joined portion is undesirably cracked during the expanding process. From a viewpoint of obtaining satisfactory mechanical characteristics of the joined portion, it is preferable that the surface roughness Rmax is maximally reduced. Incidentally, there is no lower limitation of the surface roughness Rmax joined surface. However, it is about 3 μm or higher from an industrial standpoint.

It is preferable that the joining temperature satisfies a range from 1250° C. to 1330° C. If the joining temperature is lower than 1250° C., the insert 31 cannot completely be molten or diffusion of elements becomes insufficient. As a result, the strength and ductility of the joined portion are decreased, causing cracks of the joined portion to occur during the expanding process. If the joining temperature is higher than 1330° C., the joined portion is excessively deformed. In some cases, the joined portion is molten, causing cracks of the joined portion to occur during the expanding process. More preferably, the joining temperature satisfies a range from 1280° C. to 1300° C.

It is preferable that the duration for which the joining temperature is maintained is 30 seconds or longer. If the duration is shorter than 30 seconds, diffusion of elements in the joined interface becomes insufficient. Thus, the strength and ductility of the joined portion are decreased, causing cracks of the joined portion to occur during the expanding process. The duration has no upper limit. If the foregoing temperature is maintained for a long time, a large cost is required. Therefore, it is preferable that the duration is 300 seconds or shorter.

It is preferable that the pressure is not lower than 2 MPa nor higher than 4 MPa. If the pressure is lower than 2 MPa, the joined surfaces cannot be brought into hermetic contact with each other. Thus, the strength hand ductility of the joined portion are decreased, causing cracks of the joined portion to occur during the expanding process. If the pressure is higher than 4 MPa, the joined portion is excessively deformed. Thus, the strength and ductility of the joined portion are decreased, causing cracks of the joined portion to occur during the expanding process. More preferably, the pressure is in a range of 2.5 MPa to 3.5 MPa.

It is preferable that the joining process is performed in a non-oxidizing atmosphere. If the joining process is performed in an oxidizing atmosphere, the portions adjacent to the joined interface and the insert are undesirably oxidized. Thus, the strength and ductility of the joined portion are decreased, causing cracks of the joined portion to occur during the expanding process. For example, the non-oxidizing atmosphere is argon atmosphere, helium atmosphere, nitrogen atmosphere, vacuum atmosphere or the like, but is not limited to these examples.

Heating the carbon steel pipes by a high frequency induction heating method, a high frequency direct energizing heating method or a resistance heating method performs the joining process. In particular, each of the high frequency induction heating method and the high frequency direct energizing heating method is able to easily heat relatively large carbon steel pipes. Thus, high heating efficiency can be realized and the temperature can be raised to the required joining temperature in a considerably short time. Therefore, the foregoing methods are preferred methods to heat the carbon steel pipes.

It is preferable that the frequency of high frequency electric currents for use in the high frequency induction heating method or the high frequency direct energizing heating method is 100 kHz or lower. If the frequency is higher than 100 kHz, only the surface is undesirably heated owing to the skin effect. Thus, uniform heating of the overall joined surfaces cannot be performed.

The process for expanding the joint of carbon steel pipes will now be described. The expanding process is a process for expanding the joint 32 of carbon steel pipes 30 manufactured in the foregoing joining process so as to uniform the inner diameter of the joint 32 of carbon steel pipes 30.

Specifically, a mandrel 33 is inserted into an end of the joint 32 of carbon steel pipes 30 each having the structure that the inner diameter of the non-joined portions is d0, as shown in FIG. 2A. Then, hydraulic pressure is applied from a rear position. Thus, as shown in FIG. 2B, the mandrel 33 is moved to another end of the joint 32 of carbon steel pipes 30 so as to enlarge the inner diameter of the joint 32 of carbon steel pipes 30 to d1. In the present invention, the amount of the inner diameter realized after the expanding process and enlarged from the minimum inner diameter of the non-joined portion before the expansion is called an "expansion ratio" which is defined by the following equation.

Expansion Ratio (%)=(d1−d0)×100/d0

Where d1: inner diameter of non-joined portion after expansion

D0: inner diameter of non-joined portion before expansion

The expansion ratio of the carbon steel pipe varies depending on the size and shape of the carbon steel pipe to be expanded, the mechanical characteristics of the carbon steel pipe, the state of the inner surface of the carbon steel pipe and the size, shape, the state of the surface, a lubricating method and the expanding speed of the mandrel. The expansion ratio is 25% to 30% or lower.

In general, tolerances of the outer diameter and the thickness of a carbon steel pipe manufactured as an industrial product are regulated. For example, a carbon steel pipe having a nominal diameter of 5B (schedule 40) of a hot finished seamless steel pipe of a carbon steel pipe for pressure piping (JIS G3454) regulated by Japanese Industrial Standards has the following tolerances. The tolerance of the outer diameter is ±1% (1.40 mm) with respect to the outer diameter (139.8 mm). The tolerance of the thickness is +15% (0.99 mm) and −12.5% (0.83 mm) with respect to the thickness (6.6 mm).

Therefore, the joined portion of the joint 32 constituted by joining the carbon steel pipes 30 which satisfy the foregoing dimension tolerances inevitably encounters occurrence of a discontinued shape called as the difference in the level as well as owing to aligning accuracy of the joined surfaces in the joining process.

When the expanding tool passes through the joined portion in the process for expanding the joint 32 of carbon steel pipes 30, the foregoing shape-discontinued portion serves as a stress concentration source. It leads to a fact that cracks sometimes occur in the joined portion of the joint 32 of carbon steel pipes 30. The cracks of the joined portion deteriorate the mechanical characteristics of the expanded joint 32 of carbon steel pipes 30. What is worse, fatigue cracks are widened starting with the cracks of the joined portion and corrosion proceeds. As a result, the corrosion penetrates the joined portion of the expanded joint 32 of carbon steel pipes 30 in the direction of the thickness of the joined portion. In the foregoing case, leakage of oil or gas sometimes occurs.

When the mandrel 33 is moved by using oil pressure or hydraulic pressure to expand the joint 32 of carbon steel pipes 30, the joined portion is sometimes ruptured owing to hydraulic pressure starting with the cracks of the joined portion of the joint 32 of carbon steel pipes 30. In the foregoing case, the mandrel 33 is stopped at the ruptured position, causing afterward expanding process to be inhibited. If cracks occurs in the joined portion of the joint 32 of carbon steel pipes 30 inserted into hundreds-meter shaft and having a length of hundreds of meters, the joints of carbon steel pipes more forward than the position of the cracks are sometimes separated. In the foregoing case, continuation of the expanding operation is impossible. What is worse, a shock caused from the separation results in falling of the shaft. The pressurizing fluid jets out from the gap between the shaft and the expanded joint 32 of carbon steel pipes 30. Thus, a very dangerous state is realized. In the foregoing case, the foregoing problem cannot easily be restored. If the worst happens, the oil well or the gas well must be abandoned. Thus, a great loss is produced.

To prevent occurrence of cracks of the joined portion of the joint 32 of carbon steel pipes 30 which causes the foregoing destructive damage, it is preferable that the maximum difference in level of the inner and outer surfaces in the joined portion of the joint 32 of carbon steel pipes 30 is made to be not larger than 25% of the rated thickness of the carbon steel pipes 30 which must be joined to each other. Hereinafter, the ratio (%) of the maximum difference in level of the inner and outer surfaces in the joined portion of the joint 32 of carbon steel pipes 30 with respect to the rated thickness of the carbon steel pipes 30 is called a "maximum difference in level". If the maximum difference in level is larger than 25% of the rated thickness of the carbon steel pipes 30 which must be joined, cracks undesirably occurs in the joined portion of the joint 32 of carbon steel pipes 30.

The expansion ratio of the carbon steel pipes 30 is lower than 25% to 30%. Since the difference in level which occurs in the joined portion of the joint 32 of carbon steel pipes 30 cannot completely be prevented, it is preferable that the expansion ratio of the joint 32 of carbon steel pipes 30 is 25% or lower. If the expansion ratio of the joint 32 of carbon steel pipes 30 is higher than 25%, cracks easily occurs in the joined portion of the joint 32 of carbon steel pipes 30.

The function of the present invention will now be described. A tool having an outer diameter larger than the inner diameter of the joint of carbon steel pipes is inserted into the joint of carbon steel pipes to expand the joint of carbon steel pipes. At this time, the carbon steel pipes are joined to each other under appropriate conditions so that the joint of carbon steel pipes arranged such that the maximum difference in the level of the joined portion is 25% or lower is expanded at an expansion ratio of 25% or lower. Thus, occurrence of defects, such as cracks of the joined portion of the joint of carbon steel pipes, can be prevented. Thus, an expanded joint of carbon steel pipes exhibiting excellent characteristics can be obtained.

The appropriate conditions under which the carbon steel pipe suitable for expansion are joined to each other are as follows: the insert is made of a Ni-base alloy or a Fe-base alloy having a melting point <1200° C. and a thickness ≦80 µm. Moreover, the joining operation is performed in a non-oxidizing atmosphere under conditions that surface roughness of the joining surfaces of the carbon steel pipes≦Rmax 20 µm, 1250° C. joining temperature ≦1330° C., 30 s ≦5 duration at the joining temperature and 2 MPa ≦pressure ≦4 MPa.

When the carbon steel pipes are joined to each other under the foregoing conditions, the manufactured joint of carbon steel pipes is free from occurrence of defects, such as cracks during the expanding process which is performed such that the maximum difference in the level of the joined portion is 25% or lower and the expansion ratio is 25% or lower. As a result, an expanded joint of carbon steel pipes exhibiting excellent characteristics can be obtained.

EXAMPLE 1

The following procedure was employed to manufacture a joint of carbon steel pipes. The carbon steel pipe was a carbon steel pipe for high pressure piping per Japanese Industrial Standards (JIS G3455 STS410) having an outer diameter of 139.8 mm and a thickness of 6.6 mm. The end surface of the carbon steel pipe was machined to have the surface roughness Rmax of 12 µm. An insert constituted by Ni alloy foil having a composition equivalent to nickel brazing filler metal BNi-3 (JIS Z3265), a melting point of 1050° C. and a thickness of 50 µm was inserted between the joined surfaces of the carbon steel pipes. The carbon steel pipes were joined in a liquid phase diffusion manner such that the maximum difference in the level was 5%.

The joined portion was heated by a high frequency induction heating method using a high frequency current having a frequency of 3 kHz. The joining conditions were such that the joining temperature was 1300° C., duration was 60 seconds and the pressure was 3 MPa. The joining process was performed in an Ar atmosphere. The obtained joint of carbon steel pipes was expanded to realize an expansion ratio of 20% by using a mandrel.

EXAMPLES 2 and 3 AND COMPARATIVE EXAMPLES 1 AND 2

Similar conditions to those according to Example 1 were employed to manufacture and expand the joint of carbon steel pipes except for inserts. The inserts were copper brazing filler metal foil BCu-1 (JIS Z322 having a melting point of 1080° C.: according to Comparative Example 1), Ni-base alloy foil (containing B by 1.5%, having a melting point of 1250° C.: Comparative Example 2), Fe-alloy foil (containing B by 3% and Si by 3%, having a melting point 1190° C.: Example 2) and nickel brazing filler metal foil BNi-5 (JIS Z3265, having melting point of 1140° C.: Example 3).

EXAMPLE 4

An insert which was Ni-base alloy foil having a composition equivalent to that of nickel brazing filler metal BNi-3 (JIS Z3265), a melting point of 1050° C. and a thickness of 80 µm was inserted. The other conditions were similar to those according to Example 1 so that a joint of carbon steel pipes was manufactured and expanded.

EXAMPLES 5 AND 6

In Example 5, an insert constituted by Ni-base alloy powder having a composition equivalent to nickel brazing filler metal BNi-3 (JIS Z3265) and a melting point of 1050° C. was inserted to have a thickness of 50 µm. In Example 6, a scale-shape nickel brazing filler metal having the same composition as that according to Example 5 was inserted to realize a thickness of 50 µm. The other conditions were similar to those according to Example 1 to manufacture and expand a joint of carbon steel pipes.

Comparative Example 3

In Comparative Example 3, an insert was Ni-base alloy foil having a composition equivalent to that of nickel brazing filler metal BNi-3 (JIS Z3265), a melting point of 1050° C. and a thickness of 100 μm was inserted. The other conditions were similar to those according to Example 1 so that a joint of carbon steel pipes was manufactured and expanded.

The maximum value (hereinafter called "maximum difference in level") of difference in level occurring on the inner and outer surfaces of the joined portion of each of the joints of carbon steel pipes obtained in Examples 1 to 6 and Comparative Examples 1 to 3 after the joining operation was performed was measured. Moreover, a liquid penetrant examination of the surface of the joined portion realized after the expansion operation was performed to examine whether or not cracks were present. Moreover, each of the expanded joint of carbon steel pipes was subjected to a tension test by using an Amsler type universal testing machine (200 Tonf). Results were shown in Tables 1 and 2.

TABLE 1

| Test No. | | Comparative Example 1 | Comparative Example 2 | Example 1 | Example 2 | Example 3 |
|---|---|---|---|---|---|---|
| Carbon Steel Pipe | Material | STS410 | STS410 | STS410 | STS410 | STS410 |
| | Outer Diameter (mm) | 139.8 | 139.8 | 139.8 | 139.8 | 139.8 |
| | Thickness (mm) | 6.6 | 6.6 | 6.6 | 6.6 | 6.6 |
| Roughness of Joined Surface (Rmax, μm) | | 12 | 12 | 12 | 12 | 12 |
| Insert | Material | BCu-1 | Ni-B | BNi-3 | Fe-Si-B | BNi-5 |
| | Melting Point (° C.) | 1080 | 1230 | 1050 | 1190 | 1140 |
| | Thickness (μm) | 50 | 50 | 50 | 50 | 50 |
| | Shape | foil | Foil | foil | foil | foil |
| Joining Temperature (° C.) | | 1300 | 1300 | 1300 | 1300 | 1300 |
| Duration(s) | | 60 | 60 | 60 | 60 | 60 |
| Pressure (MPa) | | 3 | 3 | 3 | 3 | 3 |
| Atmosphere for Joining Operation | | Ar | Ar | Ar | Ar | Ar |
| Method of heating Joined Portion | | High frequency Induction Heating Method (3 kHz) | High frequency Induction Heating Method (3 kHz) | High frequency Induction Heating Method (3 kHz) | High frequency Induction Heating Method (3 kHz) | High frequency Induction Heating Method (3 kHz) |
| Maximum Difference in Level of Joined Portion (%) | | 5 | 5 | 5 | 5 | 5 |
| Expansion Ratio (%) | | 20 | 20 | 20 | 20 | 20 |
| Liquid Penetrant Examination | Inner Surface | Cracks observed | Cracks observed | no cracks observed | no cracks observed | no cracks observed |
| | Outer Surface | Cracks observed | Cracks observed | no cracks observed | no cracks observed | no cracks observed |
| Result of Tension Test | Tensile Strength (MPa) | 394 | 457 | 562 | 561 | 563 |
| | Fractured Position | Joined Interface | Joined Interface | Base metal | Base metal | Base metal |
| Evaluation | | Poor | Poor | Excellent | Excellent | Excellent |

TABLE 2

| Test No. | | Example 4 | Comparative Example 3 | Example 5 | Example 6 |
|---|---|---|---|---|---|
| Carbon Steel Pipe | Material | STS410 | STS410 | STS410 | STS410 |
| | Outer Diameter (mm) | 139.8 | 139.8 | 139.8 | 139.8 |
| | Thickness (mm) | 6.6 | 6.6 | 6.6 | 6.6 |
| Roughness of Joined Surface (Rmax, μm) | | 12 | 12 | 12 | 12 |
| Insert | Material | BNi-3 | BNi-3 | BNi-3 | BNi-3 |
| | Melting Point (° C.) | 1050 | 1050 | 1050 | 1050 |
| | Thickness (μm) | 80 | 100 | 50 | 50 |
| | Shape | Foil | foil | powder | scale |
| Joining Temperature (° C.) | | 1300 | 1300 | 1300 | 1300 |
| Duration(s) | | 60 | 60 | 60 | 60 |
| Pressure (MPa) | | 3 | 3 | 3 | 3 |
| Atmosphere for Joining Operation | | Ar | Ar | Ar | Ar |
| Method of heating Joined Portion | | High frequency Induction Heating Method (3 kHz) | High frequency Induction Heating Method (3 kHz) | High frequency Induction Heating Method (3 kHz) | High frequency Induction Heating Method (3 kHz) |

TABLE 2-continued

| Test No. | | Example 4 | Comparative Example 3 | Example 5 | Example 6 |
| --- | --- | --- | --- | --- | --- |
| Maximum Difference in Level of Joined Portion (%) | | 5 | 5 | 5 | 5 |
| Expansion Ratio (%) | | 20 | 20 | 20 | 20 |
| Liquid Penetrant Examination | Inner Surface | no cracks observed | Cracks observed | no cracks observed | no cracks observed |
| | Outer Surface | no cracks observed | Cracks observed | no cracks observed | no cracks observed |
| Result of Tension Test | Tensile Strength (MPa) | 561 | 409 | 562 | 559 |
| | Fractured Position | Base metal | Joined Interface | Base metal | Base metal |
| Evaluation | | Excellent | Poor | Excellent | Excellent |

Comparative Example 1 in which the insert was copper brazing filler material foil having a melting point of 1080° C. and a thickness of 50 μm encountered cracks opened in the inner and outer surfaces of th e joined portion in the liquid penetrant examination performed after the expanding process. The tensile strength of the expanded joint of carbon steel pipes was 394 MPa. The joint of carbon steel pipes was fractured at the joined interface. When the copper brazing filler metal foil was employed as the insert, the mechanical characteristic of the joined interface was unsatisfactory in spite of the melting point being 1200° C. or lower. It was considered that the holding of the joined interface was insufficient against deformation. Thus, the joined interface encountered the cracks. Thus, the tensile strength of the expanded joint of carbon steel pipes was decreased.

Comparative Example 2 in which the insert was Ni-base alloy foil having a melting point of 1230° C. and a thickness of 50 μm encountered cracks opened in the inner and outer surfaces of the joined portion in the liquid penetrant examination performed after the expanding process. The tensile strength of the expanded joint of carbon steel pipes was 457 MPa. The joint of carbon steel pipes was fractured at the joined interface. Although the Ni-base alloy foil was employed as the insert, the insert had a high melting point of 1230° C. Thus, diffusion of elements in the molten insert was insufficient to obtain satisfactory mechanical characteristics of the joined portion. It can be considered that the tensile strength of the expanded joint of carbon steel pipes deteriorated because the cracks were formed in the joined interface.

Example 1 in which the insert was Ni-base alloy foil having a melting point of 1050° C. and a thickness of 50 μm was free from any cracks in the inner and outer surfaces of the joined portion in the liquid penetrant examination performed after the expanding process. The tensile strength of the expanded joint of carbon steel pipes was 562 MPa. The joint of carbon steel pipes was fractured in the base metal. It was considered that the Ni-base alloy foil employed as the insert was completely molten. Thus, contained elements were sufficiently diffused so that satisfactory mechanical characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

Example 2 in which the insert was Fe-alloy foil having a melting point of 1190° C. and a thickness of 50 μm was free from any cracks in the inner and outer surfaces of the joined portion in the liquid penetrant examination performed after the expanding process. The tensile strength of the expanded joint of carbon steel pipes was 561 MPa. The joint of carbon steel pipes was fractured in the base metal. It was considered that the Fe-alloy foil employed as the insert was completely molten. Thus, contained elements were sufficiently diffused so that satisfactory mechanical characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

Example 3 in which the insert was Ni-base alloy foil having a melting point of 1140° C. and a thickness of 50 μm was free from any cracks in the inner and outer surfaces of the joined portion in the liquid penetrant examination performed after the expanding process. The tensile strength of the expanded joint of carbon steel pipes was 563 MPa. The joint of carbon steel pipes was fractured in the base metal. It was considered that the Ni-base alloy foil employed as the insert was completely molten. Thus, contained elements were sufficiently diffused so that satisfactory mechanical characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

Example 4 in which the insert was Ni-base alloy foil having a melting point of 1050° C. and a thickness of 80 μm was free from any cracks in the inner and outer surfaces of the joined portion in the liquid penetrant examination performed after the expanding process. The tensile strength of the expanded joint of carbon steel pipes was 561 MPa. The joint of carbon steel pipes was fractured in the base metal. It was considered that the Ni-base alloy foil employed as the insert and having the thickness of 80 μm was completely molten. Thus, contained elements were sufficiently diffused so that satisfactory mechanical characteristics of the joined portion were obtained. Since any defects, such as the cracks, did not occur in the joined interface during the expanding process, the tensile strength of the expanded joint of carbon steel pipes was equivalent to that of the expanded base metal of the carbon steel pipe.

Comparative Example 3 in which the insert was Ni-base alloy foil having a melting point of 1050° C. and a thickness of 100 μm encountered cracks opened in the inner and outer surfaces of the joined portion. The tensile strength of the expanded joint of carbon steel pipes was 409 MPa. The joint of carbon steel pipes was fractured at the joined interface. It was considered that the diffusion of contained elements was insufficient in spite of complete melting of the Ni-base alloy foil employed as the insert and having the thickness of 100 μm. Thus, satisfactory mechanical characteristics of the joined portion were not obtained. Since the cracks were formed in the joined interface during the expanding process, the tensile strength of the joint of carbon steel pipes deteriorated.

Example 5 in which the insert was Ni-base alloy powder having a melting point of 1050° C. and a thickness of 50 μm was free from any cracks in the inner and outer surfaces of the joined portion in the liquid penetrant examination performed after the expanding process. The tensile strength of the expanded joint of carbon steel pipes was 562 MPa. The joint of carbon steel pipes was fractured in the base metal. It was considered that the Ni-base alloy powder employed as the insert and having the thickness of 50 μm was completely molten. Thus, contained elements were sufficiently diffused so that satisfactory mechanical characteristics of the joined portion were obtained. Since any defects, such as the cracks, did not occur in the joined interface during the expanding process, the tensile strength of the expanded joint of carbon steel pipes was equivalent to that of the expanded base metal of the carbon steel pipe.

Example 6 in which the insert was scale-shape Ni-base alloy having a melting point of 1050° C. and a thickness of 50 μm was free from any cracks in the inner and outer surfaces of the joined portion in the liquid penetrant examination performed after the expanding process. The tensile strength of the expanded joint of carbon steel pipes was 559 MPa. The joint of carbon steel pipes was fractured in the base metal. It was considered that the scale-shape Ni-base alloy employed as the insert and having the thickness of 50 μm was completely molten. Thus, contained elements were sufficiently diffused so that satisfactory mechanical characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

As a result, expansion of the joint of carbon steel pipes joined by using the insert which was Ni-base alloy or the Fe-base alloy having the melting point which was lower than 1200° C. and the thickness of 80 μm or smaller was permitted without occurrence of any defects, such as cracks, during the expanding process. The expanded joint of carbon steel pipes had similar mechanical characteristics to those of the expanded base metal of the carbon steel pipe.

EXAMPLE 7

The following procedure was employed to manufacture a joint of carbon steel pipes. The carbon steel pipe was a carbon steel pipe for high pressure piping per Japanese Industrial Standards (JIS G3455 STS410) having an outer diameter of 139.8 mm and a thickness of 6.6 mm. The end surface of the carbon steel pipe was machined to have the surface roughness Rmax of 20 μm. An insert constituted by Ni alloy foil having a composition equivalent to nickel brazing filler metal BNi-3 (JIS Z3265), a melting point of 1050° C. and a thickness of 50 μm was inserted between the joined surfaces of the carbon steel pipes. The carbon steel pipes were joined by a liquid phase diffusion manner such that the maximum difference in the level was 5%.

The joined portion was heated by a high frequency induction heating method using a high frequency current having a frequency of 3 kHz. The joining conditions were such that the joining temperature was 1300° C., duration was 60 seconds and the pressure was 3 MPa. The joining process was performed in an Ar atmosphere. The obtained joint of carbon steel pipes was expanded to realize an expansion ratio of 20% by using a mandrel.

Comparative Example 4

Similar conditions to those according to Example 7 were employed to manufacture and expand the joint of carbon steel pipes except for a carbon steel pipe which had end surfaces machined to realize surface roughness Rmax 25 μm.

Comparative Example 5

Similar conditions to those according to Example 7 were employed to manufacture and expand the joint of carbon steel pipes except for a carbon steel pipe which had end surfaces machined to realize surface roughness Rmax 50 μm.

The maximum difference in level occurring on the inner and outer surfaces of the joined portion of each of the joints of carbon steel pipes according to Example 7 and Comparative Examples 4 and 5 after the expanding process was measured. The liquid penetrant examination of the surface of the joined portion after the expanding process was performed to measure presence of cracks. Tension test of each of the expanded joints of carbon steel pipes was performed by using the Amsler type universal testing machine (200 Tonf). Results were shown in Table 3.

TABLE 3

| Test No. | | Example 7 | Comparative Example 4 | Comparative Example 5 |
| --- | --- | --- | --- | --- |
| Carbon Steel Pipe | Material | STS410 | STS410 | STS410 |
| | Outer Diameter (mm) | 139.8 | 139.8 | 139.8 |
| | Thickness (mm) | 6.6 | 6.6 | 6.6 |
| Roughness of Joined Surface (Rmax, μm) | | 20 | 25 | 50 |
| Insert | Material | BNi-3 | BNi-3 | BNi-3 |
| | Melting Point (° C.) | 1050 | 1050 | 1050 |
| | Thickness (μm) | 50 | 50 | 50 |
| | Shape | foil | Foil | foil |
| Joining Temperature (° C.) | | 1300 | 1300 | 1300 |
| Duration(s) | | 60 | 60 | 60 |
| Pressure (MPa) | | 3 | 3 | 3 |
| Atmosphere for Joining Operation | | Ar | Ar | Ar |
| Method of heating Joined Portion | | High frequency Induction Heating Method (3 kHz) | High frequency Induction Heating Method (3 kHz) | High frequency Induction Heating Method (3 kHz) |
| Maximum Difference in Level of Joined Portion (%) | | 5 | 5 | 5 |
| Expansion Ratio (%) | | 20 | 20 | 20 |
| Liquid Penetrant | Inner Surface | no cracks observed | cracks observed | cracks observed |

TABLE 3-continued

| Test No. | | Example 7 | Comparative Example 4 | Comparative Example 5 |
|---|---|---|---|---|
| Examination Result of Tension Test | Outer Surface Tensile Strength (MPa) | no cracks observed 560 | cracks observed 538 | cracks observed 372 |
| Evaluation | Fractured Position | Base metal Excellent | Joined Interface Poor | Joined Interface Poor |

Example 7 in which the carbon steel pipe having the joined surfaces having the surface roughness Rmax 20 μm was free from any cracks in the inner and outer surfaces of the joined portion in the liquid penetrant examination performed after the expanding process. The tensile strength of the expanded joint of carbon steel pipes was 560 MPa. The joint of carbon steel pipes was fractured in the base metal. It was considered that use of the carbon steel pipe having the joined surfaces, the surface roughness Rmax of which was 20 μm, enabled the molten insert to be distributed to the overall joined surfaces. Moreover, elements contained in the molten insert were sufficiently diffused in the joined interface. Thus, the mechanical strength of the joined interface was made to be similar to that of the base metal. Since any defects, such as the cracks, did not occur in the joined interface during the expanding process, the tensile strength of the expanded joint of carbon steel pipes was equivalent to that of the expanded base metal of the carbon steel pipe.

Comparative Example 4 in which the carbon steel pipe having the joined surfaces having the surface roughness Rmax 25 μm encountered cracks opened in the inner and outer surfaces of the joined surfaces in the liquid penetrant examination performed after the expanding process. The tensile strength of the expanded joint of carbon steel pipes was 538 MPa. The joint of carbon steel pipes was fractured at the joined interface. It was considered that the molten insert was not completely distributed to the ends of recesses of the insert. Thus, the mechanical characteristics of the joined interface was insufficient. Since cracks were formed at the joined interface during the expanding process, the tensile strength of the expanded joint of carbon steel pipes was lowered.

Comparative Example 5 in which the carbon steel pipe having the joined surfaces having the surface roughness Rmax 50 μm encountered cracks opened in the inner and outer surfaces of the joined surfaces in the liquid penetrant examination performed after the expanding process. The tensile strength of the expanded joint of carbon steel pipes was 372 MPa which was lower than that obtained in Comparative Example 4. It was considered that the molten insert was not completely distributed to the ends of recesses of the insert. Thus, the mechanical characteristics of the joined interface was insufficient. Since cracks were formed at the joined interface during the expanding process, the tensile strength of the expanded joint of carbon steel pipes was lowered.

As a result, expansion of the joint of carbon steel pipes joined by using the carbon steel pipe having the joined surfaces, the surface roughness Rmax of which was 20 μm, was permitted without occurrence of any defects, such as cracks, during the expanding process. The expanded joint of carbon steel pipes had similar mechanical characteristics to those of the expanded base metal of the carbon steel pipe.

EXAMPLE 8

The following procedure was employed to manufacture a joint of carbon steel pipes. The carbon steel pipe was a carbon steel pipe for high pressure piping per Japanese Industrial Standards (JIS G3455 STS410) having an outer diameter of 165.2 mm and a thickness of 7.1 mm. The end surface of the carbon steel pipe was machined to have the surface roughness Rmax of 20 μm. An insert constituted by Ni-base alloy foil having a composition equivalent to nickel brazing filler metal BNi-3 (JIS Z3265), a melting point of 1050° C. and a thickness of 50 μm was inserted between the joined surfaces of the carbon steel pipes. The carbon steel pipes were joined by a liquid phase diffusion manner such that the maximum difference in the level was 5%.

The joined portion was heated by a high frequency induction heating method using a high frequency current having a frequency of 3 kHz. The joining conditions were such that the joining temperature was 1250° C., duration was 30 seconds and the pressure was 3 MPa. The joining process was performed in an Ar atmosphere. The obtained joint of carbon steel pipes was expanded to realize an expansion ratio of 20% by using a mandrel.

Comparative Example 6

In Comparative Example 6, similar conditions to those according to Example 8 except for the joining temperature, which was 1200° C. and the duration was 300 seconds, so that a joint of carbon steel pipes was manufactured and expanded.

EXAMPLES 9 AND 10 AND COMPARATIVE EXAMPLE 7

In Examples 9 and 10 and Comparative Example 7, similar conditions to those according to Example 8 except for the joining temperatures, which were 1300° C., 1330° C. and 1350° C. so that joints of carbon steel pipes were manufactured and expanded.

The maximum value of difference in level occurring on the inner and outer surfaces of the joined portion of each of the joints of carbon steel pipes obtained in Examples 8 to 10 and Comparative Examples 6 and 7 after the joining operation was performed was measured. Moreover, a liquid penetrant examination of the surface of the joined portion realized after the expansion operation was performed to examine whether or not cracks were present. Moreover, each of the expanded joint of carbon steel pipes was subjected to a tension test by using an Amsler type universal testing machine (200 Tonf). Results were shown in Table 4.

TABLE 4

| Test No. | | Comparative Example 6 | Example 8 | Example 9 | Example 10 | Comparative Example 7 |
|---|---|---|---|---|---|---|
| Carbon Steel Pipe | Material | STS410 | STS410 | STS410 | STS410 | STS410 |
| | Outer Diameter (mm) | 165.2 | 165.2 | 165.2 | 165.2 | 165.2 |
| | Thickness (mm) | 7.1 | 7.1 | 7.1 | 7.1 | 7.1 |
| Roughness of Joined Surface (Rmax, μm) | | 12 | 12 | 12 | 12 | 12 |
| Insert | Material | BNi-3 | BNi-3 | BNi-3 | BNi-3 | BNi-3 |
| | Melting Point (° C.) | 1050 | 1050 | 1050 | 1050 | 1050 |
| | Thickness (μm) | 50 | 50 | 50 | 50 | 50 |
| | Shape | foil | Foil | foil | foil | foil |
| Joining Temperature (° C.) | | 1200 | 1250 | 1300 | 1330 | 1350 |
| Duration(s) | | 300 | 30 | 30 | 30 | 30 |
| Pressure (MPa) | | 3 | 3 | 3 | 3 | 3 |
| Atmosphere for Joining Operation | | Ar | Ar | Ar | Ar | Ar |
| Method of heating Joined Portion | | High frequency Induction Heating Method (3 kHz) | High frequency Induction Heating Method (3 kHz) | High frequency Induction Heating Method (3 kHz) | High frequency Induction Heating Method (3 kHz) | High frequency Induction Heating Method (3 kHz) |
| Maximum Difference in Level of Joined Portion (%) | | 5 | 5 | 5 | 5 | 5 |
| Expansion Ratio (%) | | 20 | 20 | 20 | 20 | 20 |
| Liquid Penetrant Examination | Inner Surface | cracks observed | no cracks observed | no cracks observed | no cracks observed | no cracks observed |
| | Outer Surface | no cracks observed | no cracks observed | no cracks observed | no cracks observed | cracks observed |
| Result of Tension Test | Tensile Strength (MPa) | 539 | 560 | 563 | 561 | 522 |
| | Fractured Position | Joined Interface | Base metal | Base metal | Base metal | Joined Interface |
| Evaluation | | Poor | Excellent | Excellent | Excellent | Poor |

Comparative Example 6 in which the joining temperature was 1200° C. and the duration was 300 seconds was free from cracks opened in the outer surface of the joined portion in the liquid penetrant examination performed after the expanding process. However, cracks opened in the inner surface of the joined portion. The tensile strength of the expanded joint of carbon steel pipes was 539 MPa. The joint of carbon steel pipes was fractured at the joined interface. It was considered that the joining temperature of 1200° C. resulted in occurrence of the difference in the temperature between the inner and outer surfaces of the joined portion of the carbon steel pipe in spite of melting of the insert although the duration was elongated to 300 seconds. Thus, diffusion of elements in the molten insert was insufficient in the inner surface of the joined portion. As a result, the mechanical characteristic deteriorated. Since cracks were formed at the joined interface during the expanding process, the tensile strength of the expanded joint of carbon steel pipes was lowered.

In Examples 8 to 10 in which the joining operation was performed at the joining temperatures of 1250° C., 1300° C. and 1330° C., the duration was set to be the short period of 30 seconds. Each example was free of any cracks opened in the inner and outer surfaces of the joined portion. The tensile strength values of the expanded joint of carbon steel pipes were 560 MPa, 563 MPa and 561 MPa. All of the joint of carbon steel pipes were fractured in the base metals. Although the short duration of 30 seconds was set, the temperatures 1250° C., 1300° C. and 1330° C. enabled elements in the molten insert to sufficiently be diffused. As a result, satisfactory mechanical characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

In Comparative Example 7, the joining temperature was 1350° C. and the duration was 30 seconds. Although any cracks opened in the inner surface of the joined portion was not observed in the liquid penetrant examination performed after the expanding process. Cracks were observed in the outer surface. The tensile strength of the expanded joint of carbon steel pipes was 522 MPa. The joint of carbon steel pipes was fractured at the joined interface. It was considered that the joining temperature of 1350° C. enabled elements in the molten insert to sufficiently be diffused. However, the joined portion was overheated, causing a partial melting occurs in the outer surface which served as a stress concentration source. Since cracks were formed at the joined interface during the expanding process, the tensile strength of the expanded joint of carbon steel pipes was lowered.

As a result, expansion of the joint of carbon steel pipes joined at the temperature not lower than 1250° C. nor higher than 1330° C. was permitted without any occurrence of defects, such as cracks, during the expanding process. Moreover, the expanded joint of carbon steel pipes had the mechanical characteristics equivalent to those of the expanded base metal of the carbon steel pipe.

Comparative Example 8

The following procedure was employed to manufacture a joint of carbon steel pipes. The carbon steel pipe was a carbon steel pipe for high pressure piping per Japanese Industrial Standards (JIS G3455 STS410) having an outer diameter of 165.2 mm and a thickness of 7.1 mm. The end surface of the carbon steel pipe was machined to have the surface roughness Rmax of 12 μm. An insert constituted by Ni-base alloy foil having a composition equivalent to nickel brazing filler metal BNi-3 (JIS Z3265), a melting point of 1050° C. and a thickness of 50 μm was inserted between the joined surfaces of the carbon steel pipes. The carbon steel pipes were joined by a liquid phase diffusion manner such that the maximum difference in the level was 5%.

The joined portion was heated by a high frequency induction heating method using a high frequency current having a frequency of 3 kHz. The joining conditions were such that the joining temperature was 1330° C., duration was 10 seconds and the pressure was 4 MPa. The joining process was performed in an Ar atmosphere. The obtained joint of carbon steel pipes was expanded to realize an expansion ratio of 20% by using a mandrel.

EXAMPLE 11

In Example 11, similar conditions to those according to Comparative Example 8 were employed to manufacture and expand the joint of carbon steel pipes except for the joining temperature of 1250° C., the duration of 30 seconds and the pressure of 3 MPa.

The maximum value of difference in level occurring on the inner and outer surfaces of the joined portion of each of the joints of carbon steel pipes obtained in Comparative Example 8 and Example 11 after the joining operation was performed was measured. Moreover, a liquid penetrant examination of the surface of the joined portion realized after the expansion operation was performed to examine whether or not cracks were present. Moreover, each of the expanded joint of carbon steel pipes was subjected to a tension test by using an Amsler type universal testing machine (200 Tonf). Results were shown in Table 5.

TABLE 5

| Test No. | | Comparative Example 8 | Example 11 |
|---|---|---|---|
| Carbon Steel Pipe | Metal | STS410 | STS410 |
| | Outer Diameter (mm) | 165.2 | 165.2 |
| | Thickness (mm) | 7.1 | 7.1 |
| Roughness of Joined Surface (Rmax, $\mu$m) | | 12 | 12 |
| Insert | Material | BNi-3 | BNi-3 |
| | Melting Point (° C.) | 1050 | 1050 |
| | Thickness ($\mu$m) | 50 | 50 |
| | Shape | Foil | foil |
| Joining Temperature (° C.) | | 1330 | 1250 |
| Duration(s) | | 15 | 30 |
| Pressure (MPa) | | 4 | 3 |
| Atmosphere for Joining Operation | | Ar | Ar |
| Method of heating Joined Portion | | High frequency Induction Heating Method (3 kHz) | High frequency Induction Heating Method (3 kHz) |
| Maximum Difference in Level of Joined Portion (%) | | 5 | 5 |
| Expansion Ratio (%) | | 20 | 20 |
| Liquid Penetrant Examination | Inner Surface | cracks observed | no cracks observed |
| | Outer Surface | cracks observed | no cracks observed |
| Result of Tension Test | Tensile Strength (MPa) | 427 | 558 |
| | Fractured Position | Joined interface | Base metal |
| Evaluation | | Poor | Excellent |

Comparative Example 8 in which the joining temperature was 1330° C., the duration was 15 seconds and the pressure was 4 MPa encountered cracks opened in the inner and outer surfaces of the joined portion in the liquid penetrant examination performed after the expanding process. The tensile strength of the expanded joint of carbon steel pipes was 427 MPa. The joint of carbon steel pipes was fractured at the joined interface. Although the joining temperature and the pressure were raised to 1330° C. and 4 MPa, the short duration of 15 seconds resulted in insufficient diffusion of elements in the molten insert. As a result, satisfactory mechanical characteristics of the joined portion were not obtained. Since the cracks were formed at the joined interface during the expanding process, the tensile strength of the expanded joint of carbon steel pipes was decreased.

Example 11 in which the joining temperature was 1250° C., the duration was 30 seconds and the pressure was 2 MPa was free from any cracks in the inner and outer surfaces of the joined portion in the liquid penetrant examination performed after the expanding process. The tensile strength of the expanded joint of carbon steel pipes was 558 MPa. Although the low joining temperature and pressure of 1250° C. and 2 MPa were employed, the duration of 30 seconds enabled elements in the molten insert to sufficiently be diffused. Thus, satisfactory mechanical characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

As a result, expansion of the joint of carbon steel pipes joined such that the duration at the joining temperature was 30 seconds or longer was permitted without occurrence of defects, such as cracks, during the expanding process. Moreover, the expanded joint of carbon steel pipes had similar mechanical characteristic to those of the expanded base metal of the carbon steel pipe.

Comparative Example 9

The following procedure was employed to manufacture a joint of carbon steel pipes. The carbon steel pipe was a carbon steel pipe for high pressure piping per Japanese Industrial Standards (JIS G3455 STS410) having an outer diameter of 165.2 mm and a thickness of 7. 1 mm. The end surface of the carbon steel pipe was machined to have the surface roughness Rmax of 12 $\mu$m. An insert constituted by Ni-base alloy foil having a composition equivalent to nickel brazing filler metal BNi-3 (JIS Z3265), a melting point of 1050° C. and a thickness of 50 $\mu$m was inserted between the joined surfaces of the carbon steel pipes. The carbon steel pipes were joined by a liquid phase diffusion manner such that the maximum difference in the level was 5%.

The joined portion was heated by a high frequency induction heating method using a high frequency current having a frequency of 3 kHz. The joining conditions were such that the joining temperature was 1330° C., duration was 300 seconds and the pressure was 1 MPa. The joining process was performed in an Ar atmosphere. The obtained joint of carbon steel pipes was expanded to realize an expansion ratio of 20% by using a mandrel.

EXAMPLES 12 AND 13 AND COMPARATIVE EXAMPLE 10

In Examples 12 and 13 and Comparative Example 10, similar conditions to those according to Comparative Example 9 were employed to manufacture and expand the joint of carbon steel pipes except for the following parameters: the joining temperature was 1250° C., the duration was 30 seconds and the pressure was 2 MPa in Example 12; the joining temperature was 1300° C., the duration was 60 seconds and the pressure was 4 MPa in Example 13; and the joining temperature was 1330° C., the duration was 30 seconds and the pressure was 5 MPa in Comparative Example 10.

The maximum value of difference in level occurring on the inner and outer surfaces of the joined portion of each of the joints of carbon steel pipes obtained in Comparative Example 9, Examples 12 and 13 and Comparative Example 10 after the joining operation was performed was measured. Moreover, a liquid penetrant examination of the surface of the joined portion realized after the expansion operation was performed to examine whether or not cracks were present. Moreover, each of the expanded joint of carbon steel pipes was subjected to a tension test by using an Amsler type universal testing machine (200 Tonf). Results were shown in Table 6.

TABLE 6

| Test No. | | Comparative Example 9 | Example 12 | Example 13 | Comparative Example 10 |
|---|---|---|---|---|---|
| Carbon Steel Pipe | Material | STS410 | STS410 | STS410 | STS410 |
| | Outer Diameter (mm) | 165.2 | 165.2 | 165.2 | 165.2 |
| | Thickness (mm) | 7.1 | 7.1 | 7.1 | 7.1 |
| Roughness of Joined Surface (Rmax, μm) | | 12 | 12 | 12 | 12 |
| Insert | Material | BNi-3 | BNi-3 | BNi-3 | BNi-3 |
| | Melting Point (° C.) | 1050 | 1050 | 1050 | 1050 |
| | Thickness (μm) | 50 | 50 | 50 | 50 |
| | Shape | foil | foil | foil | foil |
| Joining Temperature (° C.) | | 1330 | 1250 | 1300 | 1330 |
| Duration(s) | | 300 | 30 | 60 | 30 |
| Pressure (MPa) | | 1 | 2 | 4 | 5 |
| Atmosphere for Joining Operation | | Ar | Ar | Ar | Ar |
| Method of heating Joined Portion | | High frequency Induction Heating Method (3 kHz) | High frequency Induction Heating Method (3 kHz) | High frequency Induction Heating Method (3 kHz) | High frequency Induction Heating Method (3 kHz) |
| Maximum Difference in Level of Joined Portion (%) | | 5 | 5 | 5 | 5 |
| Expansion Ratio (%) | | 20 | 20 | 20 | 20 |
| Liquid Penetrant Examination | Inner Surface | cracks observed | no cracks observed | no cracks observed | cracks observed |
| | Outer Surface | cracks observed | no cracks observed | no cracks observed | cracks observed |
| Result of Tension Test | Tensile Strength (MPa) | 384 | 561 | 563 | 439 |
| | Fractured Position | Joined interface | Base metal | Base metal | Joined interface |
| Evaluation | | Poor | Excellent | Excellent | Poor |

Comparative Example 9 in which the joining temperature was 1330° C., the duration was 300 seconds and the pressure was 1 MPa encountered cracks opened in the inner and outer surfaces of the joined portion in the liquid penetrant examination performed after the expanding process. The tensile strength of the expanded joint of carbon steel pipes was 384 MPa. The joint of carbon steel pipes was fractured at the joined interface. Although the joining temperature was raised to 1330° C. and the duration was elongated to 300 seconds, the low pressure of 1 MPa encountered a fact that the molten insert was impossible to sufficiently cover the pits and projections of the joined surfaces. As a result, satisfactory mechanical characteristics of the joined portion were not obtained. Thus, the joined interface was impossible to endure deformation caused from the expanding operation. Since the cracks were formed at the joined interface during the expanding process, the tensile strength of the expanded joint of carbon steel pipes was decreased.

Example 12 in which the joining temperature was 1250° C., the duration was 30 seconds and the pressure was 2 MPa and Example 13 in which the joining temperature was 1300° C., the duration was 60 seconds and the pressure was 4 MPa were free from any cracks in the inner and outer surfaces of the joined portion in the liquid penetrant examination performed after the expanding process. The tensile strength values of the expanded joint of carbon steel pipes were 561 MPa and 563 MPa, respectively. Both of the joints of carbon steel pipes were fractured in the base metals. Since the pressure was set to be 2 MPa to 4 MPa, the molten insert was able to sufficiently cover the pits and projections of the joined surfaces and diffusion of the insert was permitted. Thus, satisfactory mechanical characteristics of the joined portion were obtained. Since any defects, such as the cracks, did not occur in the joined interface during the expanding process, the tensile strength of the expanded joint of carbon steel pipes was equivalent to that of the expanded base metal of the carbon steel pipe.

Comparative Example 10 in which the joining temperature was 1330° C., the duration was 30 seconds and the pressure was 5 MPa encountered cracks opened in the inner and outer surfaces of the joined portion in the liquid penetrant examination performed after the expanding process. The tensile strength of the expanded joint of carbon steel pipes was 439 MPa. The joint of carbon steel pipes was fractured at the joined interface. Since the excessive pressure of 5 MPa caused the joined portion to excessively be deformed, the foregoing portion served as the stress concentration source. Since the cracks were formed at the joined interface during the expanding process, the tensile strength of the expanded joint of carbon steel pipes was decreased.

As a result, expansion of the joint of carbon steel pipes joined such that the pressure was 2 MPa to 4 MPa was permitted without occurrence of defects, such as cracks, during the expanding process. Moreover, the expanded joint of carbon steel pipes had similar mechanical characteristic to those of the expanded base metal of the carbon steel pipe.

Comparative Example 11

The following procedure was employed to manufacture a joint of carbon steel pipes. The carbon steel pipe was a carbon steel pipe for high pressure piping per Japanese Industrial Standards (JIS G3455 STS410) having an outer diameter of 165.2 mm and a thickness of 7.1 mm. The end surface of the carbon steel pipe was machined to have the surface roughness Rmax of 12 μm. An insert constituted by Ni-base alloy foil having a composition equivalent to nickel brazing filler metal BNi-3 (JIS Z3265), a melting point of 1050° C. and a thickness of 50 μm was inserted between the joined surfaces of the carbon steel pipes. The carbon steel pipes were joined by a liquid phase diffusion manner such that the maximum difference in the level was 5%.

The joined portion was heated by a high frequency induction heating method using a high frequency current having a frequency of 3 kHz. The joining conditions were such that the joining temperature was 1300° C., duration was 60 seconds and the pressure was 3 MPa. The joining process was performed in the atmospheric air. The obtained joint of carbon steel pipes was expanded to realize an expansion ratio of 20% by using a mandrel.

EXAMPLES 14 AND 15

In Examples 14 and 15, similar conditions to those according to Comparative Example 11 were employed to manufacture and expand the joint of carbon steel pipes except for the atmospheres for the joining operations which were He and vacuum (<10$^{-3}$ mmHg), respectively.

The maximum value of difference in level occurring on the inner and outer surfaces of the joined portion of each of the joints of carbon steel pipes obtained in Comparative Example 11 and Examples 14 and 15 after the joining operation was performed was measured. Moreover, a liquid penetrant examination of the surface of the joined portion realized after the expansion operation was performed to examine whether or not cracks were present. Moreover, each of the expanded joint of carbon steel pipes was subjected to a tension test by using an Amsler type universal testing machine (200 Tonf). Results were shown in Table 7.

cal characteristics of the joined portion were obtained. Since any defects, such as the cracks, did not occur at the joined interface during the expanding process, the tensile strength of the expanded joint of carbon steel pipes was equivalent to that of the expanded base metal of the carbon steel pipe.

As a result, expansion of the joint of carbon steel pipes joined such that the atmosphere for the joining operation was a non-oxidizing atmosphere was permitted without occurrence of defects, such as cracks, during the expanding process. Moreover, the expanded joint of carbon steel pipes had similar mechanical characteristic to those of the expanded base metal of the carbon steel pipe.

Comparative Example 12

The following procedure was employed to manufacture a joint of carbon steel pipes. The carbon steel pipe was a

TABLE 7

| Test No. | | Example 7 | Comparative Example 4 | Comparative Example 5 |
|---|---|---|---|---|
| Carbon Steel Pipe | Material | STS410 | STS410 | STS410 |
| | Outer Diameter (mm) | 165.2 | 165.2 | 165.2 |
| | Thickness (mm) | 7.1 | 7.1 | 7.1 |
| Roughness of Joined Surface (Rmax, μm) | | 12 | 12 | 12 |
| Insert | Material | BNi-3 | BNi-3 | BNi-3 |
| | Melting Point (° C.) | 1050 | 1050 | 1050 |
| | Thickness (μm) | 50 | 50 | 50 |
| | Shape | foil | foil | foil |
| Joining Temperature (° C.) | | 1300 | 1300 | 1300 |
| Duration(s) | | 60 | 60 | 60 |
| Pressure (MPa) | | 3 | 3 | 3 |
| Atmosphere for Joining Operation | | atmospheric air | He | vacuum |
| Method of heating Joined Portion | | High frequency Induction Heating Method (3 kHz) | High frequency Induction Heating Method (3 kHz) | High frequency Induction Heating Method (3 kHz) |
| Maximum Difference in Level of Joined Portion (%) | | 5 | 5 | 5 |
| Expansion Ratio (%) | | 20 | 20 | 20 |
| Liquid Penetrant Examination | Inner Surface | cracks observed | no cracks observed | no cracks observed |
| | Outer Surface | cracks observed | no cracks observed | no cracks observed |
| Result of Tension Test | Tensile Strength (MPa) | 311 | 560 | 564 |
| | Fractured Position | Joined Interface | Base metal | Base metal |
| Evaluation | | Poor | Excellent | Excellent |

Comparative Example 11 in which the joining operation was performed in the atmospheric air encountered cracks opened in the inner and outer surfaces of the joined portion in the liquid penetrant examination performed after the expanding process. The tensile strength of the expanded joint of carbon steel pipes was 311 MPa. The joint of carbon steel pipes was fractured at the joined interface. Since the joining operation was performed in the atmospheric air, oxides were formed in the joined interface. As a result, satisfactory mechanical characteristics of the joined portion were not obtained. Thus, the joined interface was impossible to endure deformation caused from the expanding operation. Since the cracks were formed at the joined interface during the expanding process, the tensile strength of the expanded joint of carbon steel pipes was decreased.

Example 14 in which the atmosphere for the joining operation was He and Example 15 in which the atmosphere for the joining operation was vacuum were free from any cracks in the inner and outer surfaces of the joined portion in the liquid penetrant examination performed after the expanding process. The tensile strength values of the expanded joint of carbon steel pipes were 560 MPa and 564 MPa. Both of the joints of carbon steel pipes were fractured in the base metals. Since any oxide which exerts an adverse influence on the diffusion of elements in the molten insert was not formed at the joined interface, satisfactory mechanicarbon steel pipe for high pressure piping per Japanese Industrial Standards (JIS G3455 STS410) having an outer diameter of 165.2 mm and a thickness of 7.1 mm. The end surface of the carbon steel pipe was machined to have the surface roughness Rmax of 12 μm. An insert constituted by Ni-base alloy foil having a composition equivalent to nickel brazing filler metal BNi-3 (JIS Z3265), a melting point of 1050° C. and a thickness of 50 μM was inserted between the joined surfaces of the carbon steel pipes. The carbon steel pipes were joined by a liquid phase diffusion manner such that the maximum difference in the level was 5%.

The joined portion was heated by a high frequency induction heating method using a high frequency current having a frequency of 200 kHz. The joining conditions were such that the joining temperature was 1300° C., duration was 60 seconds and the pressure was 3 MPa. The joining process was performed in an Ar atmosphere. The obtained joint of carbon steel pipes was expanded to realize an expansion ratio of 20% by using a mandrel.

EXAMPLES 16 AND 17

In Examples 16 and 17, similar conditions to those according to Comparative Example 12 were employed to manufacture and expand the joint of carbon steel pipes except for the following parameters: a high frequency induction heating method using a frequency of 100 kHz and a high frequency energization heating method using a frequency of 25 kHz, respectively. The maximum value of difference in level occurring on the inner and outer surfaces of the joined portion of each of the joints of carbon steel pipes obtained in comparative Example 12 and Examples 16 and 17 after the joining operation was performed was measured. Moreover, a liquid penetrant examination of the surface of the joined portion realized after the expansion operation was performed to examine whether or not cracks were present. Moreover, each of the expanded joint of carbon steel pipes was subjected to a tension test by using an Amsler type universal testing machine (200 Tonf). Results were shown in Table 8.

formed after the expanding process. The tensile strength values of the expanded joint of carbon steel pipes were 559 MPa and 561 MPa. Both of the joints of carbon steel pipes were fractured in the base metals. Since the high frequency induction heating method or the high frequency energization heating method using the frequency of 100 kHz or lower was employed to perform the joining operation, an adverse influence of the skin effect was prevented. Thus, satisfactory mechanical characteristics of the joined portion were obtained. Since any defects, such as the cracks, did not occur in the joined interface during the expanding process, the tensile strength of the expanded joint of carbon steel pipes was equivalent to that of the expanded base metal of the carbon steel pipe.

TABLE 8

| Test No. | | Comparative Example 12 | Example 16 | Example 17 |
|---|---|---|---|---|
| Carbon Steel Pipe | Material | STS410 | STS410 | STS410 |
| | Outer Diameter (mm) | 165.2 | 165.2 | 165.2 |
| | Thickness (mm) | 7.1 | 7.1 | 7.1 |
| Roughness of Joined Surface (Rmax, μm) | | 12 | 12 | 12 |
| Insert | Material | BNi-3 | BNi-3 | BNi-3 |
| | Melting Point (° C.) | 1050 | 1050 | 1050 |
| | Thickness (μm) | 50 | 50 | 50 |
| | Shape | foil | foil | foil |
| Joining Temperature (° C.) | | 1300 | 1300 | 1300 |
| Duration(s) | | 60 | 60 | 60 |
| Pressure (MPa) | | 3 | 3 | 3 |
| Atmosphere for Joining Operation | | Ar | Ar | Ar |
| Method of heating Joined Portion | | High frequency Induction Heating Method (3 kHz) | High frequency Induction Heating Method (3 kHz) | High frequency Induction Heating Method (3 kHz) |
| Maximum Difference in Level of Joined Portion (%) | | 5 | 5 | 5 |
| Expansion Ratio (%) | | 20 | 20 | 20 |
| Liquid Penetrant Examination | Inner Surface | cracks observed | no cracks observed | no cracks observed |
| | Outer Surface | cracks observed | no cracks observed | no cracks observed |
| Result of Tension Test | Tensile Strength (MPa) | 337 | 559 | 561 |
| | Fractured Position | Joined Interface | Base metal | Base metal |
| Evaluation | | Poor | Excellent | Excellent |

Comparative Example 12 in which the joining operation was performed by the high frequency induction heating method using the frequency of 200 kHz encountered cracks opened in the inner and outer surfaces of the joined portion in the liquid penetrant examination performed after the expanding process. The tensile strength of the expanded joint of carbon steel pipes was 337 MPa. The joint of carbon steel pipes was fractured at the joined interface. Since the joining operation was performed by the high frequency induction heating method using the high frequency of 200 kHz, the difference in the temperature occurred between the inner and outer surfaces of the joined portion owing to a skin effect. As a result, satisfactory mechanical characteristics of the joined portion were not obtained. Thus, the joined interface was impossible to endure deformation caused from the expanding operation. Since the cracks were formed at the joined interface during the expanding process, the tensile strength of the expanded joint of carbon steel pipes was decreased.

In Example 15, the joining operation was performed by the high frequency induction heating method using the frequency of 100 kHz. In Example 16, the joining operation was performed by the high frequency induction heating method using the frequency of 25 kHz. Examples 15 and 16 were free from any cracks in the inner and outer surfaces of the joined portion in the liquid penetrant examination per- As a result, expansion of the joint of carbon steel pipes joined such that high frequency induction heating method or the high frequency energization heating method using the frequency of 100 kHz or lower was employed was permitted without occurrence of defects, such as cracks, during the expanding process. Moreover, the expanded joint of carbon steel pipes had similar mechanical characteristic to those of the expanded base metal of the carbon steel pipe.

Comparative Example 13

The following procedure was employed to manufacture a joint of carbon steel pipes. The carbon steel pipe was a carbon steel pipe for high pressure piping per Japanese Industrial Standards (JIS G3455 STS410) having an outer diameter of 165.2 mm and a thickness of 7.1 mm. The end surface of the carbon steel pipe was machined to have the surface roughness Rmax of 12 μm. An insert constituted by Ni-base alloy foil having a composition equivalent to nickel brazing filler metal BNi-3 (JIS Z3265), a melting point of 1050° C. and a thickness of 50 μm was inserted between the joined surfaces of the carbon steel pipes. The carbon steel pipes were joined by a liquid phase diffusion manner such that the maximum difference in the level was 30%.

The joined portion was heated by a high frequency induction heating method using a high frequency current having a frequency of 3 kHz. The joining conditions were such that the joining temperature was 1300° C., duration was 30 seconds and the pressure was 3 MPa. The joining process was performed in an Ar atmosphere. The obtained joint of carbon steel pipes was expanded to realize an expansion ratio of 25% by using a mandrel.

EXAMPLES 18 AND 19

In Examples 18 and 19, similar conditions to those according to Comparative Example 13 were employed to manufacture and expand the joint of carbon steel pipes except for the maximum differences in the level which were 25% and 10%, respectively.

Comparative Example 14

In Comparative Example 14, similar conditions to those according to Comparative Example 13 were employed to manufacture and expand the joint of carbon steel pipes except for the maximum difference in the level which was 5% and the expansion ratio which was 30%.

The liquid penetrant examination of the surface of the joined portion of the joints of carbon steel pipes according to Examples 18 and 19 and Comparative Examples 13 and 14 realized after the expansion operation was performed to examine whether or not cracks were present. Moreover, each of the expanded joint of carbon steel pipes was subjected to a tension test by using an Amsler type universal testing machine (200 Tonf). Results were shown in Table 9.

MPa and 561 MPa, respectively. Both of the joints of carbon steel pipes were fractured in the base metals. Although concentration of stress occurred owing to the difference in level of the joined interface, the expansion ratio of 25% did not cause cracks to be formed during the expanding operation. Thus, the expanded joint of carbon steel pipes had similar mechanical characteristic to those of the expanded base metal of the carbon steel pipe.

Comparative Example 14 in which the expanding operation was performed such that the maximum difference in level was 5% and the expansion ratio was 30% encountered cracks opened in the inner and outer surfaces of the joined portion in the liquid penetrant examination performed after the expanding process. The tensile strength of the expanded joint of carbon steel pipes was 521 MPa. The joint of carbon steel pipes was fractured at the joined interface. Since the expansion ratio was a large ratio of 30% in spite of the small value of the maximum difference in level of the joined surfaces of 5%, cracks occurred owing to concentration of stress during the expanding operation. It leads to a fact that the tensile strength of the expanded joint of carbon steel pipes deteriorated.

As a result, expansion of the joint of carbon steel pipes joined such that the joining operation was performed by making the maximum difference in level to be 25% or lower and the expansion ratio to be 25% or lower was permitted without occurrence of defects, such as cracks, during the expanding process. Moreover, the expanded joint of carbon

TABLE 9

| Test No. | | Comparative Example 9 | Example 12 | Example 13 | Comparative Example 10 |
|---|---|---|---|---|---|
| Carbon Steel Pipe | Material | STS410 | STS410 | STS410 | STS410 |
| | Outer Diameter (mm) | 165.2 | 165.2 | 165.2 | 165.2 |
| | Thickness (mm) | 7.1 | 7.1 | 7.1 | 7.1 |
| Roughness of Joined Surface (Rmax, μm) | | 12 | 12 | 12 | 12 |
| Insert | Material | BNi-3 | BNi-3 | BNi-3 | BNi-3 |
| | Melting Point (° C.) | 1050 | 1050 | 1050 | 1050 |
| | Thickness (μm) | 50 | 50 | 50 | 50 |
| | Shape | foil | Foil | foil | Foil |
| Joining Temperature (° C.) | | 1300 | 1300 | 1300 | 1300 |
| Duration(s) | | 60 | 60 | 60 | 60 |
| Pressure (MPa) | | 3 | 3 | 3 | 3 |
| Atmosphere for Joining Operation | | Ar | Ar | Ar | Ar |
| Method of heating Joined Portion | | High frequency Induction Heating Method (3 kHz) | High frequency Induction Heating Method (3 kHz) | High frequency Induction Heating Method (3 kHz) | High frequency Induction Heating Method (3 kHz) |
| Maximum Difference in Level of Joined Portion (%) | | 30 | 25 | 10 | 5 |
| Expansion Ratio (%) | | 25 | 25 | 25 | 25 |
| Liquid Penetrant Examination | Inner Surface | separated at the joined interface | no cracks observed | no cracks observed | Cracks observed |
| | Outer Surface | | no cracks observed | no cracks observed | Cracks observed |
| Result of Tension Test | Tensile Strength (MPa) | — | 559 | 561 | 521 |
| | Fractured Position | — | Base metal | Base metal | Joined interface |
| Evaluation | | Poor | Excellent | Excellent | Poor |

Comparative Example 13 in which the maximum difference in level was 30% and the expansion ratio was 25% encountered separation of the joint of carbon steel pipes from the joined interface during the expanding operation. Therefore, the tension test of the expanded joint of carbon steel pipes was impossible.

Examples 18 and 19 in which the maximum differences in level were 25% and 10% and the expansion ratio was 25% were free from any cracks in the inner and outer surfaces of the joined portion in the liquid penetrant examination performed after the expanding process. The tensile strength values of the expanded joint of carbon steel pipes were 559 steel pipes had similar mechanical characteristic to those of the expanded base metal of the carbon steel pipe.

In the present invention, the insert is the Ni-base alloy or the Fe-base alloy having the melting point which is lower than 1200° C. and a thickness of 80 μm or smaller. The carbon steel pipes are abutted against each other in the non-oxidizing atmosphere under conditions that the surface roughness Rmax of the joined surfaces of the carbon steel pipes is 20 μm or smaller, the joining temperature is not lower than 1250° C. nor higher than 1330° C., the duration at the joining temperature is 30 seconds or higher and the pressure is not lower than 2 MPa nor higher than 4 MPa.

Thus, an effect can be obtained in that the joint of carbon steel pipes having the satisfactory mechanical characteristic equivalent to those of the base metal of the carbon steel pipe and free from occurrence of defects, such as cracks, during the expanding process can be obtained within a range that the maximum difference in level is not larger than 25% of the thickness of the carbon steel pipe and the expansion ratio is 25% or lower.

As described above, the method of manufacturing the joint of carbon steel pipes and the expanding method according to the present invention enables the joint of carbon steel pipes to be expanded without occurrence of defects, such as cracks of the joined portion. Thus, the joint of carbon steel pipes can be obtained which exhibits satisfactory mechanical characteristics after the expanding operation has been performed. When the joint of carbon steel pipes according to the present invention is applied to a casing tube, a production tube or a coiled tube for use in an oil well or a gas well, the cost of petroleum or gas drilling operation can significantly be reduced. Thus, the present invention permits a great industrial effect to be obtained.

What is claimed is:

1. A method for manufacturing a joint of carbon steel pipes suitable for expansion, comprising the steps of:

abutting carbon steel pipes against each other;

inserting an insert having a melting point (Ti) lower than a melting point (Tb) of a base metal of said carbon steel pipes in between joint surfaces of said carbon steel pipes;

heating at least a portion adjacent to said joint portion to a temperature (T) expressed by Ti<T<Tb; and pressurizing and holding said two carbon steel pipes to diffusion-weld said two carbon steel pipes to each other;

wherein said insert comprises a Ni-base alloy or a Fe-base alloy having a melting point lower than 1200° C. and a thickness of 80 $\mu$m or smaller, and a joining operation is performed in a non-oxidizing atmosphere under conditions that surface roughness Rmax of said joining surfaces of said carbon steel pipes is 20 $\mu$m or smaller, joining temperature is in the range of 1250° C. to 1330° C., duration at said joining temperature is 30 seconds or longer and applied pressure is in the range of 2 MPa to 4 MPa.

2. The method for manufacturing a joint of carbon steel pipes according to claim 1, wherein the heating step of a joint portion is performed by a high frequency induction heating method or a high frequency energization heating method using a high frequency current having a frequency not higher than 100 kHz.

3. The method for manufacturing a joint of carbon steel pipes according to claim 1, wherein a maximum difference in level of said joint portion is not larger than 25% of the thickness of said carbon steel pipe.

4. The method for manufacturing a joint of carbon steel pipes according to claim 1, wherein duration at said joining temperature is 300 seconds or shorter.

* * * * *